US009551452B1

(12) United States Patent
Thorne

(10) Patent No.: US 9,551,452 B1
(45) Date of Patent: Jan. 24, 2017

(54) SYSTEM AND METHOD FOR PROTECTING GENERATORS FROM DAMAGE DUE TO FLOODWATER

(71) Applicant: James V. Thorne, Island Park, NY (US)

(72) Inventor: James V. Thorne, Island Park, NY (US)

(*) Notice: Subject to any disclaimer, the term of this patent is extended or adjusted under 35 U.S.C. 154(b) by 0 days.

(21) Appl. No.: 14/716,870

(22) Filed: May 19, 2015

(51) Int. Cl.
| | |
|---|---|
| *E02D 27/00* | (2006.01) |
| *F16M 5/00* | (2006.01) |
| *E04H 9/14* | (2006.01) |
| *B66B 9/00* | (2006.01) |
| *E04H 6/06* | (2006.01) |
| *E04B 1/346* | (2006.01) |
| *E04B 7/16* | (2006.01) |
| *E02D 35/00* | (2006.01) |
| *E04G 21/14* | (2006.01) |
| *E04H 12/34* | (2006.01) |
| *E02B 17/08* | (2006.01) |
| *B63C 1/00* | (2006.01) |
| *B63C 3/00* | (2006.01) |
| *E02B 3/20* | (2006.01) |
| *B63B 35/44* | (2006.01) |
| *E02B 3/24* | (2006.01) |
| *B63C 1/02* | (2006.01) |
| *E02B 3/06* | (2006.01) |
| *E04H 9/00* | (2006.01) |

(52) U.S. Cl.
CPC ............... *F16M 5/00* (2013.01); *E04H 9/14* (2013.01); *E04H 9/145* (2013.01); *B63B 35/44* (2013.01); *B63C 1/02* (2013.01); *E02B 3/068* (2013.01); *E02B 3/24* (2013.01); *E04H 9/00* (2013.01)

(58) Field of Classification Search
CPC ............... B63B 35/44; B63C 1/02; E02B 3/24; E02B 3/068; E04H 9/00; E04H 9/14; E04H 9/145
USPC ......... 114/263–266; 405/103–106, 218–221, 405/196–200, 229; 248/669; 52/1, 29, 111, 114, 52/117, 125.1, 169.11, 169.13, 169.14, 167.1, 52/169.9, 298, 299
See application file for complete search history.

(56) References Cited

U.S. PATENT DOCUMENTS

| | | | | |
|---|---|---|---|---|
| 2,984,076 | A * | 5/1961 | Bradley | B63B 35/44 114/263 |
| 3,074,238 | A * | 1/1963 | De Golian | E02B 3/064 114/263 |
| 5,081,946 | A * | 1/1992 | Nannig | B63B 35/34 114/264 |
| 5,795,098 | A * | 8/1998 | Rueckert | B63C 1/02 114/263 |

(Continued)

*Primary Examiner* — Brian Mattei
*Assistant Examiner* — Taylor Morris

(57) ABSTRACT

Systems and method are provided to protect devices from damage due to floodwaters. For example, a system includes a floating platform assembly, an apparatus securely disposed on the floating platform assembly, first and second platform retaining members connected to the floating platform assembly, and first and second vertical support members disposed on opposite sides of the floating platform assembly. Upper ends of the first and second vertical support members are connected to an outer sidewall of a dwelling, and bottom ends of the first and second vertical support members are fixedly secured at ground level. The first and second platform retaining members insertably receive the first and second vertical support members, respectively. The first and second platform retaining members are configured to slide along the respective first and second vertical support members when the floating platform assembly vertically rises and lowers in response to a changing level of floodwater.

18 Claims, 4 Drawing Sheets

(56) References Cited

U.S. PATENT DOCUMENTS

| | | | |
|---|---|---|---|
| 7,086,349 B2* | 8/2006 | Bagnall | A01K 63/006 119/246 |
| 7,182,034 B2* | 2/2007 | Brine | E02B 3/064 114/263 |
| 7,921,604 B2* | 4/2011 | Lino | E04H 9/14 114/264 |
| 2008/0273926 A1* | 11/2008 | Polk | E02B 3/068 405/231 |
| 2013/0087089 A1* | 4/2013 | Lill | B63B 21/00 114/263 |

* cited by examiner

SYSTEM AND METHOD FOR PROTECTING GENERATORS FROM DAMAGE DUE TO FLOODWATER

TECHNICAL FIELD

This disclosure generally relates to techniques for protecting devices from damage due to floodwater.

BACKGROUND

Many residential homes and commercial buildings are located in regions that are prone to flooding. Such flooding can occur for various reasons. For example, some homes and commercial buildings are located close to waterways such as bays, canals, rivers, etc., which occasionally can have abnormally high water levels due to storm surges and other natural phenomena. Moreover, other homes and buildings can be located in low-lying areas with high water tables. In such circumstances, severe weather such as torrential rainstorms or hurricanes, for example, can cause flash flooding due to an increase in the water table, and the resulting inability for sewer systems to drain away flash flooding. Unfortunately, such flooding can cause significant financial damage to individuals and business owners whose dwellings, structures, and personal property are destroyed by rising floodwaters.

SUMMARY OF THE INVENTION

Embodiments of the invention include systems and methods for protecting apparatus from damage due to floodwaters. For example, one embodiment of the invention includes a system to protect an apparatus from floodwater. The system includes a floating platform assembly, an apparatus securely disposed on the floating platform assembly, first and second platform retaining members connected to the floating platform assembly, and first and second vertical support members disposed on opposite sides of the floating platform assembly. Upper ends of the first and second vertical support members are connected to an outer sidewall of a dwelling, and bottom ends of the first and second vertical support members are fixedly secured at ground level. The first and second platform retaining members insertably receive the first and second vertical support members, respectively. The first and second platform retaining members are configured to slide along the respective first and second vertical support members when the floating platform assembly vertically rises and lowers in response to a changing level of floodwater.

Another embodiment includes a method for protecting an apparatus from floodwater. The method includes placing a floating platform assembly on ground level adjacent an outer wall of a dwelling; securely mounting an apparatus on the floating platform assembly; connecting first and second platform retaining members to the floating platform assembly; and securely positioning first and second vertical support members on opposite sides of the floating platform assembly, with the first and second vertical support members inserted through the first and second platform retaining members, respectively. The first and second platform retaining members are configured to slide along the respective first and second vertical support members when the floating platform assembly vertically rises and lowers in response to a changing level of floodwater.

These and other embodiments will be described in the following detailed description of embodiments, which is to be read in conjunction with the accompanying figures.

DETAILED DESCRIPTION OF EMBODIMENTS

Figure 1:
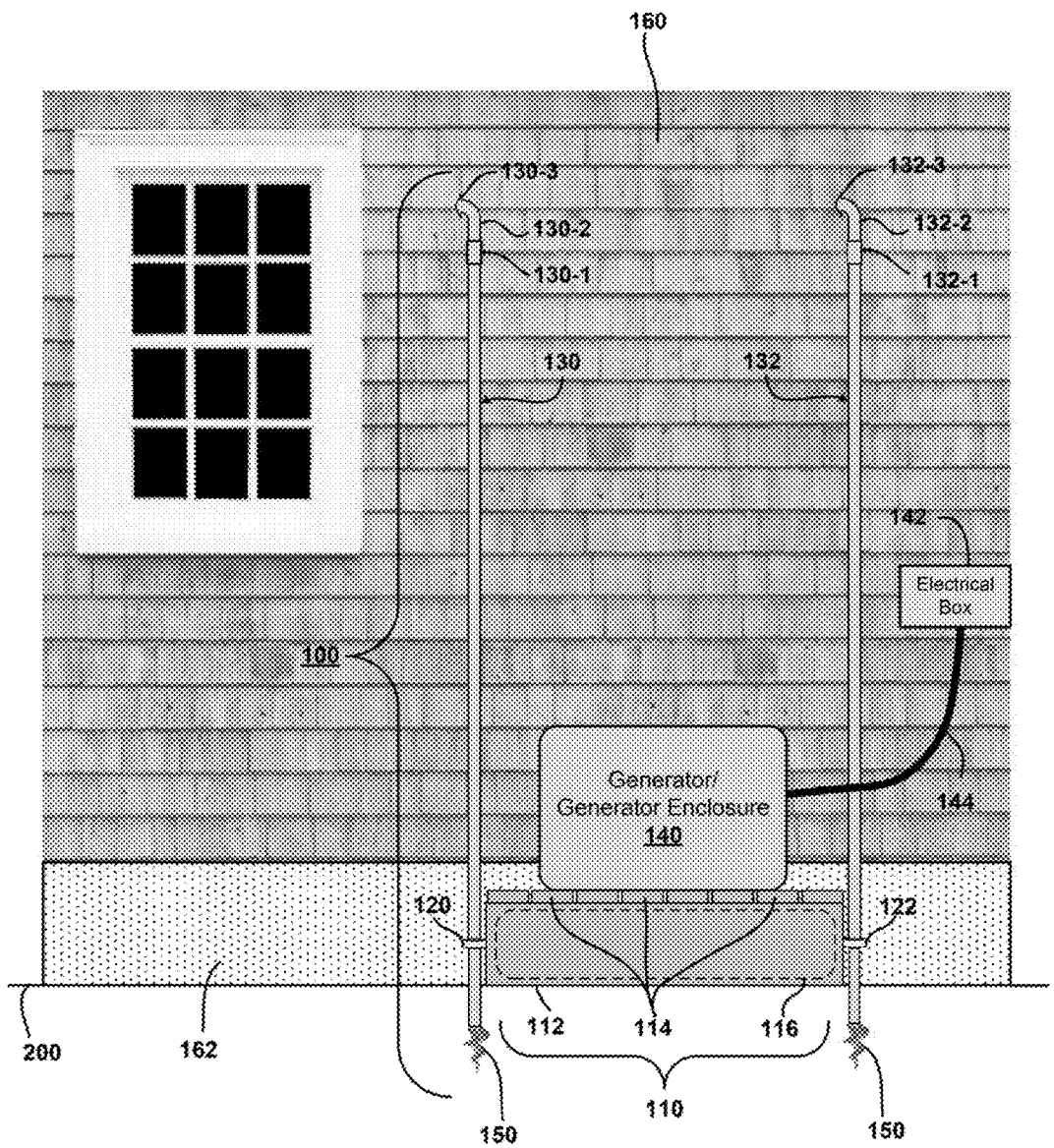
FIG. 1 schematically illustrates a system for protecting a device from floodwater, according to an embodiment of the invention.

Embodiments of the invention will now be described in further detail with regard to systems and methods for protecting devices from damage due to floodwaters. For example, FIG. 1 schematically illustrates a system 100 for protecting a device from floodwater, according to an embodiment of the invention. The system 100 comprises a floating platform assembly 110, platform retaining members 120 and 122, vertical support members 130 and 132, and an apparatus 140 which is disposed or otherwise fixedly mounted on top of the floating platform assembly 110. In one embodiment of the invention, the apparatus 140 comprises, for example, a portable or non-portable generator, or a portable or non-portable generator enclosed in a plastic or weather resistant housing, or other types of devices that are typically maintained outside of a home or commercial building.

The apparatus 140 (e.g., generator) is electrically connected to an electrical box 142 via suitable electrical wiring 144. For illustrative purposes, embodiments of the invention will be discussed with reference to systems and methods for protecting generators from floodwaters, although techniques as disclosed herein can be utilized to protect other types of devices, systems or apparatus such as HVAC (heating, ventilating, and air conditioning) units, etc., from floodwater.

The floating platform assembly 110 comprises a frame 112 (e.g., rectangular-shaped frame) having an open bottom side, and an upper side with decking 114. In one embodiment of the invention, the frame 112 and decking 114 can be constructed using weather resistant wood (e.g., pressure treated wood) or commercially available composite decking material. For example, the frame 112 can be fabricated using 2"×8" or 2"×10" stringers (lumber or composite material), for example, and the decking 114 may be 2"×6" or 5/4"×4" or 5/4"×6" lumber or composite decking material, for example.

The floating platform assembly 110 further comprises at least one float member 116 (shown in phantom as a dashed line in FIGS. 1, 2A and 2B) disposed within the interior region of the frame 112 underneath the decking 114. The float member 116 is configured to floatably support the floating platform assembly 110 in the event of a flood, and thereby raise the generator 140 above the floodwater to prevent water damage to the generator 140, as will be further discussed below with reference to FIGS. 2A and 2B. Furthermore, as explained below with reference to FIGS. 5 and 6, the float member 116 can be implemented using various types of floatation devices and materials.

The float member 116 may or may not be fixedly secured within the frame 112. For example, when assembling the floating platform assembly 110, one or more float members 116 can be placed in a target position on ground level 200, and then an already constructed frame 112 and decking 114 assembly can be placed over the one or more float members 116 such that the float members 116 are freely disposed within the interior region of the frame 112 underneath the decking 114. In such instance, when a floodwater occurs, the buoyancy force (upward force) exerted by the water against the floating member 116 will cause the floating member 116 to apply force against the bottom of the decking 114, and cause the floating platform assembly 110 to rise, while the floating member 116 remains positioned within the interior of the frame 112 pushing against the underside of the decking 114.

As further shown in FIG. 1, the platform retaining members 120 and 122 are connected to opposite sides of the frame 112 using, e.g., screws or bolts. The elongated vertical support members 130 and 132 are inserted through the respective platform retaining members 120 and 122. The platform retaining members 120 and 122 are configured, with regard to size and shape, to slidably engage the elongated vertical support members 130 and 132, while providing a free-floating fit that enables the floating platform assembly 110 to be vertically displaced (up and down) relative to the elongated vertical support members 130 and 132 in response to rising and falling floodwater levels, and while maintaining the floating platform assembly 110 in a relatively fixed distance from an outer wall 160 of a dwelling while the floating platform assembly 110 moves in a vertical direction (up and down) in response to rising and lowering floodwaters.

In one embodiment of the invention, the elongated vertical support members 130 and 132 may be implemented using solid or hollow piping. For example, the elongated vertical support members 130 and 132 may be implemented using hollow hot-dipped galvanized piping, with a diameter in a range of about ¾" to 1.50", for example. The elongated vertical support members 130 and 132 can be implemented using other types of materials and cross-sectional shapes. In addition, as explained below with reference to FIGS. 3 and 4, the platform retaining members 120 and 122 can be implemented using various types of retaining devices and techniques that are suitable for the given application, which will vary based on the cross-sectional size and shape of the elongated vertical support members 130 and 132.

Figure 2A:
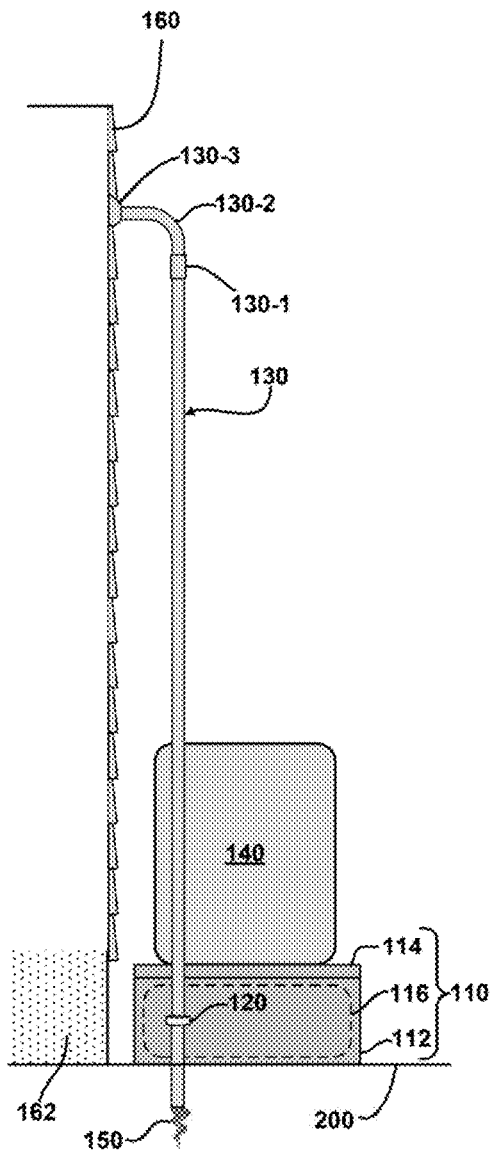
FIG. 2A is a schematic side view of the system of FIG. 1.

As further shown in FIGS. 1 and 2A, each elongated vertical support member 130 and 132 has an upper end connected to the outer wall 160 of a dwelling, and a bottom end fixedly secured to the ground. In particular, in one embodiment of the invention, the elongated vertical support member 130 comprises a connecting sleeve 130-1 that connects to an elbow portion 130-2, which enables the upper end of the elongated vertical support member 130 to be connected to the outer wall 160 of the dwelling via a retaining flange 130-3, for example. Similarly, the upper end of the elongated vertical support member 132 comprises a connecting sleeve 132-1 that connects to an elbow portion 132-2, which enables the upper end of the elongated vertical support member 132 to be connected to the outer wall 160 of the dwelling via a retaining flange 132-3, for example. In other embodiments of the invention, other structures and techniques may be used to secure the upper ends of the elongated vertical support members 130 and 132 to the outer wall 160 of the dwelling or to other dwelling structures (e.g., overhangs).

Furthermore, in one embodiment of the invention, the bottom ends of the elongated vertical support members 130 and 132 can be fixedly secured to the ground by burying the ends of the elongated vertical support members 130 and 132 within the ground soil at some depth below ground level 200 (e.g., about 1 foot or more) which is sufficient to fixedly secure the end portions of the elongated vertical support members 130 and 132. In another embodiment of the invention, as specifically shown in FIG. 1, for example, auger members 150 may be connected to the bottom ends of the elongated vertical support members 130 and 132, wherein the auger members 150 are configured to be screwed into the ground soil, thereby securing the bottom portions of the elongated vertical support members 130 and 132 in position within the ground soil.

In another embodiment, the floating platform assembly 110 may be disposed on top of a slab of concrete (as opposed to being disposed directly on top of grass or soil), in which case the bottom ends of the elongated vertical support members 130 and 132 can be secured to respective flange devices that are bonded or otherwise connected to the surface of the concrete slab. In yet another embodiment of the invention, small concrete footings or slabs can be constructed in the ground on opposite sides of the floating platform assembly 110, whereby such small concrete footings or slabs can be utilized as secure structures to which the bottom ends of the elongated vertical support members 130 and 132 can be connected to fixedly secure the vertical support members 130 and 132 to the ground.

It is to be understood that other structures and techniques may be used to secure the bottom ends of the elongated vertical support members 130 and 132 to some fixed structure. For example, in one embodiment of the invention, the bottoms ends of the elongated vertical support members 130 and 132 can have elbow portions and other hardware to securely fix the bottom ends of the elongated vertical support members 130 and 132 to, e.g., a foundation 162 of the dwelling (similar to the techniques shown in FIGS. 1, 2A, and 2B for connecting the upper ends of the elongated vertical support members 130 and 132 to the outer wall 160 of the dwelling).

Figure 2B:
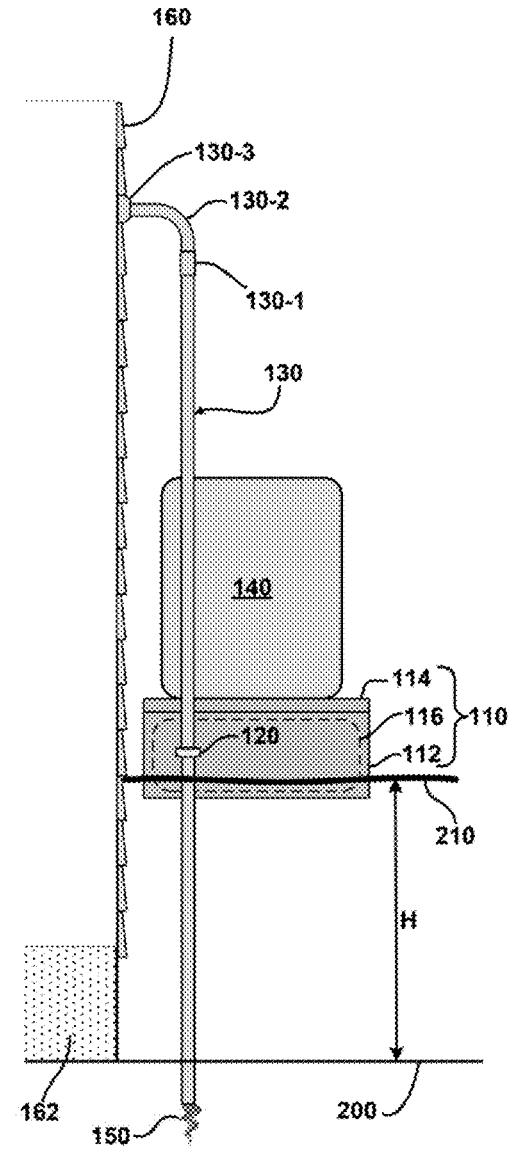
FIG. 2B is a schematic side view of the system of FIG. 1, showing a mode of operation of the system in response to a flood.

FIG. 2A is a schematic side view of the system 100 of FIG. 1 when no flood is present, and FIG. 2B is a schematic side view of the system 100 of FIG. 1, showing a mode of operation of the system 100 in response to a flood. As shown in FIG. 2A, when no flood is present, the floating platform assembly 110 rests on the ground at ground level 200 adjacent the foundation 162 of the dwelling. As shown in FIG. 2B, when a floodwater level 210 rises at some height H above the ground level 200, the floating platform assembly 110 will rise and float on top of the floodwater to prevent the generator 140 (or other device or unit disposed on the platform) from being damaged by the floodwater. In this regard, the floating platform assembly 110 vertically moves up and down between the elongated vertical support members 130 and 132, while the platform retaining members 120 and 122 slidably engage the elongated vertical support members 130 and 132 and maintain the floating platform assembly 110 at some fixed distance from the outer wall 160 as the floating platform assembly 100) rises and lowers with the level of the floodwater.

As further shown in FIG. 2A, in one embodiment of the invention, the elongated vertical support members 130 and 132, and corresponding platform retaining members 120 and 122 are disposed in a back region of the floating platform assembly 110 in relative close proximity to the outer wall 160 and foundation 162 of the dwelling. In other embodiments, the elongated vertical support members 130 and 132 and corresponding platform retaining members 120 and 122 can be disposed in a middle region or a front region of the floating platform assembly 110. Moreover, in another embodiment of the invention, a pair of elongated vertical support members and corresponding platform retaining members can be disposed on each side of the floating platform assembly 110 in the front and back regions of the floating platform assembly 110.

It is to be understood that the number of elongated vertical support members that are implemented, and the positioning of the elongated vertical support members with regard to the floating platform assembly 110, will vary depending on various factors. Such factors include, but are not limited to, the size and shape of the floating platform assembly 110, the size and weight of the device/apparatus that is disposed on the floating platform assembly 110, the strength of the piping used for the elongated vertical support members, the manner in which the elongated vertical support members are secured to the ground, and other factors that should be taken into consideration to ensure that the floating platform assembly 110 will be securely maintained in position by the elongated vertical support members (and not float away or be violently rocked) in circumstances in which the floodwaters are turbulent, or contain floating or submerged debris that can bang into, and damage, one or more of the elongated vertical support members, etc.

Figure 3:
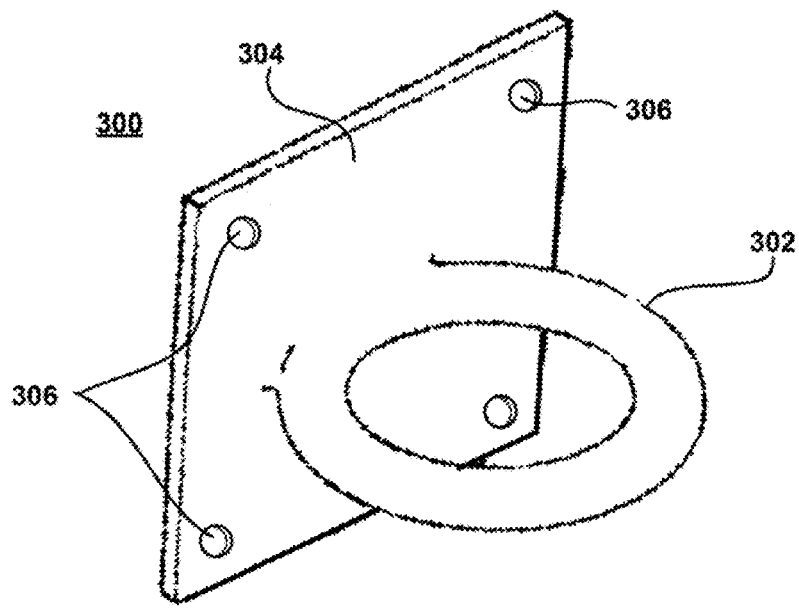
FIG. 3 illustrates a platform retaining member that can be implemented in the system of FIG. 1, according to an embodiment of the invention.

FIG. 3 illustrates a platform retaining member 300 that can be implemented in the system 100 of FIG. 1, according to an embodiment of the invention. The platform retaining member 300 comprises a ring 302 that is welded to, or otherwise integrally formed with, a mounting plate 304. The mounting plate 304 comprises a plurality or holes 306 to connect the platform retaining member 300 to the frame 112 of the floating platform assembly 110. The ring 302 can be circular-shaped, u-shaped, or square-shaped, for example. The size (e.g., inner diameter) of the ring 302 should be larger than the outer diameter (or size) of the vertical support member (e.g., piping) that is used in conjunction with the platform retaining member 300. This will ensure that the platform retaining member 300 will freely slide along the vertical support member even as the floating platform assembly 110 rocks back and forth in turbulent floodwater, or when the weight (of the device/apparatus) on the floating platform assembly 110 is not centrally disposed (or evenly distributed over the decking), causing the horizontal plane of the floating platform assembly 110 to be tilted (and therefore not orthogonal) with respect to the vertical support members.

Figure 4:
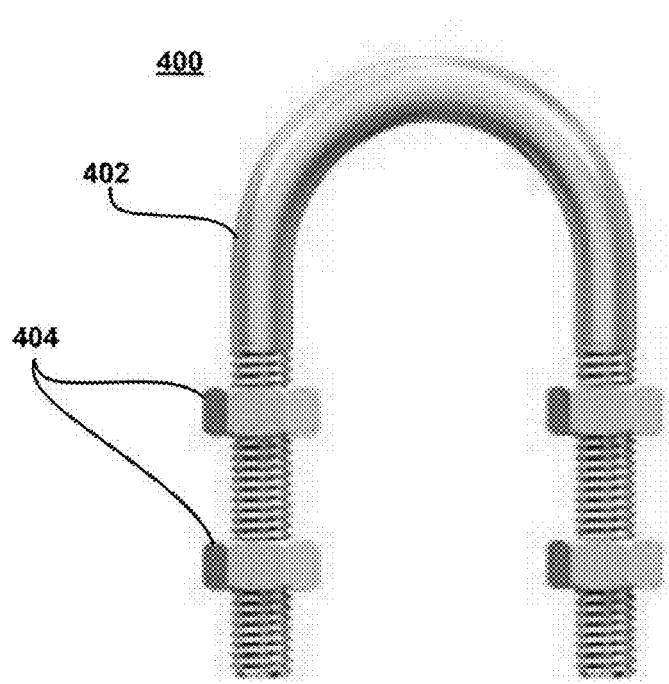
FIG. 4 illustrates a platform retaining member that can be implemented in the system of FIG. 1, according to another embodiment of the invention.

FIG. 4 illustrates a platform retaining member 400 that can be implemented in the system 100 of FIG. 1, according to another embodiment of the invention. In this embodiment, the platform retaining member 400 comprises a U-bolt 402 that can be connected to the frame 112 of the floating platform assembly 110 using bolts 404 and washers (not shown), or using other conventional techniques for mounting U-bolt devices to structures. For the same or similar reasons discussed above with reference to FIG. 3, the size (e.g., inner diameter) of the U-bolt 402 should be larger than the outer diameter (or size) of the vertical support member (e.g., piping) that is used in conjunction with the platform retaining member 400.

Figure 5:
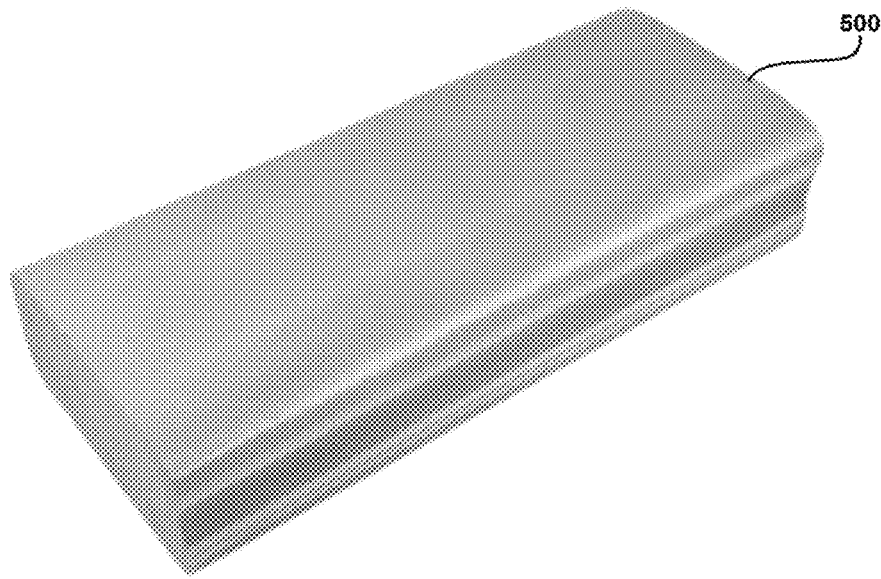
FIG. 5 illustrates a float member that can be implemented in the system of FIG. 1, according to an embodiment of the invention.
Figure 6:
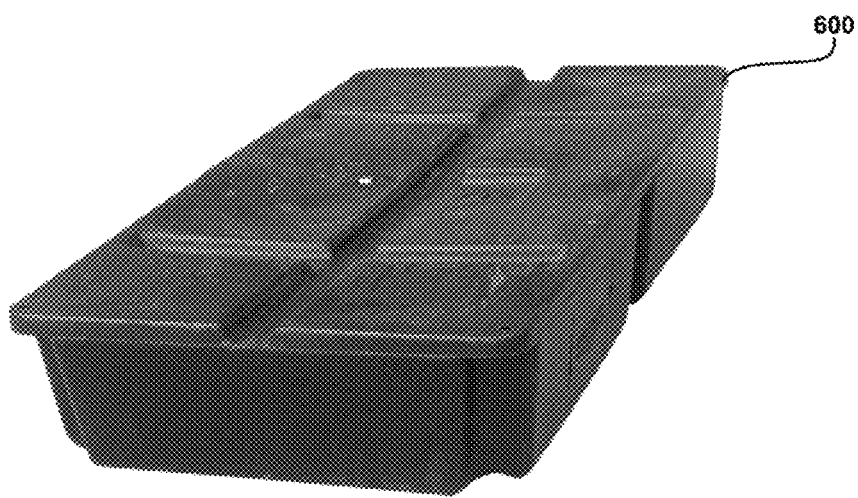
FIG. 6 illustrates a float member that can be implemented in the system of FIG. 1, according to another embodiment of the invention.

FIG. 5 illustrates a float member 500 that can be implemented in the system 100 of FIG. 1, according to an embodiment of the invention. In this embodiment, the float member 500 comprises a block of Styrofoam or polystyrene foam, which can be cut to size to fit within the interior of the frame 112. FIG. 6 illustrates a float member 600 that can be implemented in the system 100 of FIG. 1, according to another embodiment of the invention. In this embodiment, the float member 600 is a commercially available foam-filled plastic float element. While commercially available foam-filled plastic float elements (FIG. 6) are manufactured in various sizes and shapes, utilizing a block of Styrofoam or polystyrene foam (FIG. 5) allows for more flexibility in constructing a custom sized and shaped floating platform assembly, as the block of Styrofoam or polystyrene foam can be custom cut (in size and shape) to accommodate the size and shape of the interior region of the frame portion 112 of the floating platform assembly 110. On the other hand, commercially available foam-filled plastic float elements (FIG. 6) are more structurally resilient to water and weather damage, as compared to the exposed Styrofoam or polystyrene foam material (FIG. 5). In all embodiments, the size of the float member that is used (e.g., length, width, thickness) will depend on the weight of the device 140 that is to be supported by the floating platform assembly 110, so as to achieve a suitable buoyancy and/or flotation capacity (in terms of weight).

Although illustrative embodiments of the present invention have been described herein with reference to the accompanying drawings, it is to be understood that the invention is not limited to those precise embodiments, and that various other changes and modifications may be implemented by one of ordinary skill in the art without departing from the scope or spirit of the invention.

What is claimed is:

1. A system to protect an apparatus from floodwater, comprising:

a floatable platform assembly initially disposed on substantially dry ground;

an apparatus securely disposed on the floatable platform assembly, wherein the apparatus comprises an electric generator connected to an electrical system of a dwelling that is constructed on the substantially dry ground;

first and second platform retaining members connected to the floatable platform assembly; and first and second vertical support members disposed on opposite sides of the floatable platform assembly;

wherein upper ends of the first and second vertical support members are connected to an outer sidewall of the dwelling, and wherein bottom ends of the first and second vertical support members are fixedly secured to the substantially dry ground;

wherein the first platform retaining member insertably receives the first vertical support member, wherein the second platform retaining member insertably receives the second vertical support member; and wherein the first and second platform retaining members are configured to slide along the respective first and second vertical support members when the floatable platform assembly begins to float in response to floodwater which floods the substantially dry ground so that the floatable platform assembly vertically rises and lowers in response to a changing level of the floodwater to prevent the apparatus from being damaged by the floodwater.

2. The system of claim 1, wherein the floatable platform assembly comprises a frame, decking disposed on top of the frame, and a floatable member disposed within the frame below the decking.

3. The system of claim 2, wherein the floatable member comprises a block of foam material.

4. The system of claim 3, wherein the block of foam material is encased in plastic material.

5. The system of claim 1, wherein the first and second vertical support members comprise galvanized piping.

6. The system of claim 1, wherein first and second platform retaining members comprise ring-shaped retaining elements.

7. The system of claim 1, wherein first and second platform retaining members comprise U-shaped retaining elements.

8. The system of claim 1, wherein the bottom ends of the first and second vertical support members are buried below the substantially dry ground.

9. The system of claim 1, further comprising auger elements connected to the bottom ends of the first and second vertical support members, wherein the auger elements are configured to screw into the substantially dry ground.

10. A method for protecting an apparatus from floodwater, comprising:

initially placing floatable platform assembly on substantially dry ground adjacent an outer wall of a dwelling that is constructed on the substantially dry ground;

securely mounting an apparatus on the floatable platform assembly, wherein the apparatus comprises an electric generator connected to an electrical system of a dwelling that is constructed on the substantially dry ground;

connecting first and second platform retaining members to the floatable platform assembly; and securely positioning first and second vertical support members on opposite sides of the floatable platform assembly, with the first and second vertical support members inserted through the first and second platform retaining members, respectively, wherein the first and second platform retaining members are configured to slide along the respective first and second vertical support members when the floatable platform assembly begins to float in response to floodwater which floods the substantially dry ground so that the floatable platform assembly vertically rises and lowers in response to a changing level of the floodwater to prevent the apparatus from being damaged by the floodwater.

11. The method of claim 10, further comprising constructing the floatable platform assembly, wherein the floatable platform assembly comprises a frame and decking disposed on top of the frame, and a floatable member disposed within the frame below the decking.

12. The method of claim 11, wherein constructing the floatable platform assembly comprises placing the floatable member on the ground level, and placing the frame with decking over the floatable member such that floatable member is freely disposed within an interior of the frame below the decking.

13. The method of claim 11, wherein the floatable member comprises a block of foam material.

14. The method of claim 13, wherein the block of foam material is encased in plastic material.

15. The method of claim 10, wherein the first and second vertical support members comprise galvanized piping.

16. The method of claim 10, wherein first and second platform retaining members comprise ring-shaped retaining elements, or U-shaped retaining elements, which insertably receive the first and second vertical support members, respectively.

17. The method of claim 10, wherein securely positioning the first and second vertical support members on opposite sides of the floatable platform assembly comprises:

connecting upper ends of the first and second vertical support members to the outer wall of the dwelling; and securing bottom ends of the first and second vertical support members to the substantially dry ground.

18. The method of claim 17, wherein securing the bottom ends of the first and second vertical support members to the substantially dry ground comprises burying the bottom ends of the first and second vertical support members within the substantially dry ground.

* * * * *